United States Patent [19]

Naruse et al.

[11] 4,420,937
[45] Dec. 20, 1983

[54] HYDRAULIC CIRCUIT FOR A VARIABLE DISPLACEMENT PUMP

[75] Inventors: Toshihiro Naruse, Kawasaki; Kazuo Uehara, Tokyo; Hideaki Saito, Fujisawa, all of Japan

[73] Assignee: Kabushiki Kaisha Komatsu Seisakusho, Tokyo, Japan

[21] Appl. No.: 286,535

[22] Filed: Jul. 24, 1981

[30] Foreign Application Priority Data

Jul. 28, 1980 [JP] Japan .................. 55-105608[U]

[51] Int. Cl.³ .................................. F16H 39/46
[52] U.S. Cl. ................................ 60/450; 60/452; 417/218
[58] Field of Search ............. 60/450, 452, 445, 420; 417/218, 219, 220, 221, 222

[56] References Cited

U.S. PATENT DOCUMENTS

| | | | |
|---|---|---|---|
| 2,431,094 | 11/1947 | Tucker | 417/219 |
| 2,892,312 | 6/1959 | Allen et al. | 60/450 |
| 3,486,334 | 12/1969 | Miller | 60/452 |
| 3,777,492 | 12/1973 | Boydell et al. | 60/445 |
| 3,871,178 | 3/1975 | Tominaga | 60/445 |

Primary Examiner—Robert E. Garrett
Assistant Examiner—Richard L. Klein
Attorney, Agent, or Firm—Armstrong, Nikaido, Marmelstein & Kubovcik

[57] ABSTRACT

A hydraulic circuit for a so called feathering control of a variable displacement pump in which displacement of the variable displacement pump is controlled to a minimum when every actuator in a system is not in operation thereby keeping a power loss to a minimum. The hydraulic circuit includes a jet flow sensor for detecting a dynamic pressure of fluid. The jet flow sensor is disposed in a circuit for connecting a system pressure line to a reservoir and is adapted to convert static pressure of the fluid to dynamic pressure thereof. This detected dynamic pressure is introduced into a servo mechanism for the variable displacement pump for effecting feathering control.

4 Claims, 2 Drawing Figures

HYDRAULIC CIRCUIT FOR A VARIABLE DISPLACEMENT PUMP

BACKGROUND OF THE INVENTION

This invention relates to a hydraulic circuit arranged to control the amount of the fluid delivered by a variable displacement pump by the action of a dynamic pressure produced by a nozzle which is located in a bypass passage for draining the fluid under pressure into a tank and which serves to convert the static pressure into the dynamic pressure.

As for the hydraulic circuit of the kind specified, there has been generally employed a hydraulic circuit wherein a restrictor means provided with a relief valve is located in a bypass passage and the amount of the fluid delivered by a variable displacement pump is controlled by the static pressure generated upstream of the restrictor means.

In the hydraulic circuit of the above-mentioned arrangement, however, there is a risk that when the control valves are shifted to their neutral positions the static pressure upstream of the restrictor means is increased suddenly by the fluid under pressure flowing into the bypass passage thereby causing a hunting throughout the entire circuit. Therefore, a relief valve has been provided between the upstream side of the restrictor means and the circuit extending to a drain tank to deal with such a sharp sudden pressure rise. However, such a hydraulic circuit has been disadvantageous in that the cost thereof is high because of the necessity of provision of a relief valve capable of responding quickly to the above-mentioned sudden pressure rise.

SUMMARY OF THE INVENTION

It is therefore an object of the present invention to provide a hydraulic circuit for controlling displacement of a variable displacement pump which overcomes the above noted problems of the prior art.

Another object of the present invention is to provide an improved hydraulic circuit for feathering control of a variable displacement pump wherein the pump is controlled to have a minimum displacement and a minimum pressure when none of actuators in a system is in operation.

A further object of the present invention is to provide a hydraulic circuit for feathering control of a variable displacement pump wherein a jet flow sensor is disposed in a circuit connecting a system pressure line to a reservoir for detecting dynamic pressure of a fluid which in turn controls the displacement of the pump to a minimum.

In accordance with an aspect of the present invention, there is provided a hydraulic circuit for controlling displacement of a variable displacement pump including a servo mechanism connected thereto for controlling the same, comprising: an actuator driven by said variable displacement pump; a control valve disposed between said variable displacement pump and said actuator for controlling the latter; and means for converting static pressure of a fluid into a dynamic pressure thereof, said means being disposed in a circuit for connecting a system pressure line of the hydraulic circuit to a reservoir when said control valve occupies its neutral position and comprising a body having formed therein an inlet port connected to the system pressure line and an outlet port connected to the reservoir, said body also having formed therein a nozzle provided between said inlet and outlet ports for producing a jet flow of the fluid and a dynamic pressure sensing means operatively connected to the servo mechanism for said variable displacement pump.

The means for converting static pressure of a fluid into dynamic pressure thereof is appropriately called a jet flow sensor herein because a jet flow of the fluid is produced passing through the nozzle. The dynamic pressure of the jet flow is detected by the dynamic pressure sensing means which is usually a hole formed in the body. The dynamic pressure thus detected is introduced into the servo mechanism for effecting the feathering of the variable displacement pump.

In a first preferred embodiment, the control valve has a bypass passage formed in the neutral position thereof and the jet flow sensor is disposed in a bypass circuit connecting the bypass passage of the control valve to the reservoir. In order to prevent an excess pressure build up in the bypass circuit, a relief valve may be provided to connect the bypass circuit directly to the reservoir.

In a second preferred embodiment, the jet flow sensor is also disposed in a relief valve circuit for relieving an excess pressure in the hydraulic system to the reservoir.

The above and other objects, features and advantages of the present invention will be readily apparent from the following description taken in conjunction with the accompanying drawings.

DESCRIPTION OF THE PREFERRED EMBODIMENTS

Figure 1:
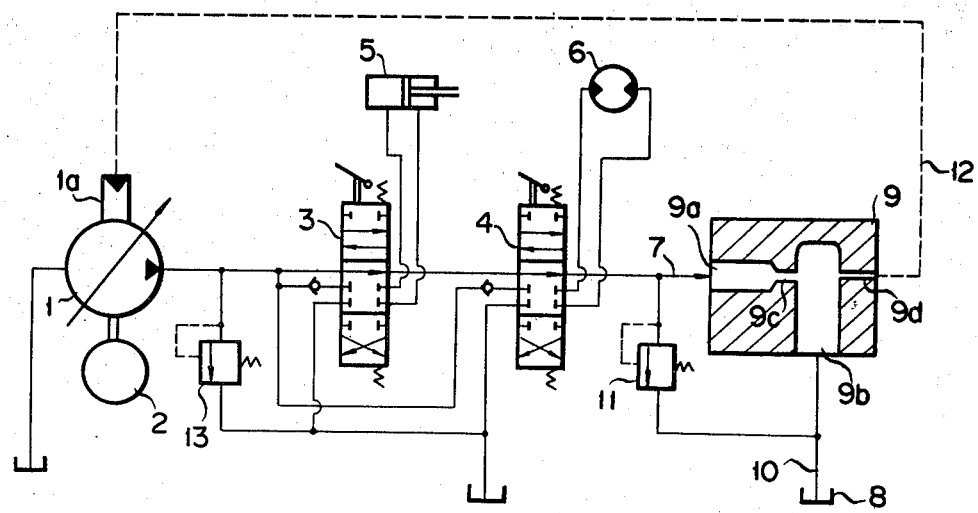
FIG. 1 is a hydraulic circuit showing one embodiment of the present invention.

The present invention will now be described by way of example only with reference to the accompanying drawings. In the drawings, reference numeral 1 denotes a variable displacement pump driven by a prime mover 2. The fluid under pressure delivered by the pump 1 is supplied through a plurality of control valves, for example, valves 3 and 4 into actuators 5 and 6 installed for the valves 3, 4, respectively, and is drained through a bypass passage 7 into a tank 8 when both the control valves 3 and 4 are located at their neutral positions. Further, a jet flow sensor 9 adapted to convert the static pressure into a dynamic pressure and sensing thereof is provided in the bypass passage 7, and a relief valve 11 is provided between the upstream side of the jet flow sensor 9 and a pipe 10 extending from the jet flow sensor to the tank 8. The jet flow sensor 9 has an inlet port 9a connected to the bypass passage 7, an outlet port 9b which is located at substantially right angles to the inlet port 9a and communicates with the pipe or circuit 10 extending to the tank 8 and a nozzle 9c formed between the inlet port 9a and the outlet port 9b. The static pressure generated on the side of the inlet port 9a is damped or reduced when it passes through the nozzle 9c. Stated in brief, the nozzle 9c serves to convert the static pressure of the pressurized fluid into a dynamic pressure when the fluid passes therethrough, and after passing through the nozzle 9c the fluid will spurt into the outlet port 9b in the form of a jet. The arrangement is made such that the dynamic pressure of the fluid jet is detected or taken out by a dynamic pressure detection hole 9d formed opposite to the nozzle 9c with respect to outlet port 9b.

In general, as the rate of flow of the fluid passing through the restrictor portion increases, the gain in the pressure fluctuations in the bypass passage 7 relative to changes in the rate of flow of fluid through the restrictor means will increase. In contrast thereto, the present invention is characterized in that since the fluid jet is diffused in the outlet port 9b when the rate of flow of the fluid through the nozzle increases, the gain in the dynamic pressure fluctuations relative to the change of the rate of flow of the fluid therethrough will not become excessive.

The dynamic pressure taken out through the dynamic pressure detection hole 9d is introduced through a conduit 12 into a servo mechanism 1a of the variable displacement pump 1 and the amount of the fluid delivered by the variable displacement pump 1 is controlled by the dynamic pressure thus detected as follows.

When any of the control valves 3, 4 controls any of the corresponding actuators 5, 6, no fluid pressure is produced in the bypass passage 7 and therefore no dynamic pressure is generated by the jet flow sensor 9 so that the variable displacement pump 1 is operating at its maximum flow rate. Subsequently, if all the control valves 3 and 4 are shifted to their neutral positions, respectively, to cease the operation of the actuators 5 and 6, all the fluid under pressure delivered by the variable displacement pump 1 will flow into the bypass passage 7 so that a static pressure is created by the nozzle 9c within the inlet port 9a. A part of the fluid having the static pressure thus created is sent through the relief valve 11 into the tank 8, but the remaining part thereof is damped in static pressure and simultaneously converted into a dynamic pressure when it passes through the nozzle 9c and then spurted from the nozzle 9c into the outlet port 9b. The dynamic pressure thus produced is taken out by the dynamic pressure detection hole 9d and is introduced by the pipe or conduit 12 into the servo mechanism 1a of the variable displacement pump 1 thereby controlling the pump 1 to reduce the amount of fluid delivered thereby to its minimum value. In brief, the variable displacement pump 1 is subjected to feathering control.

Figure 2:
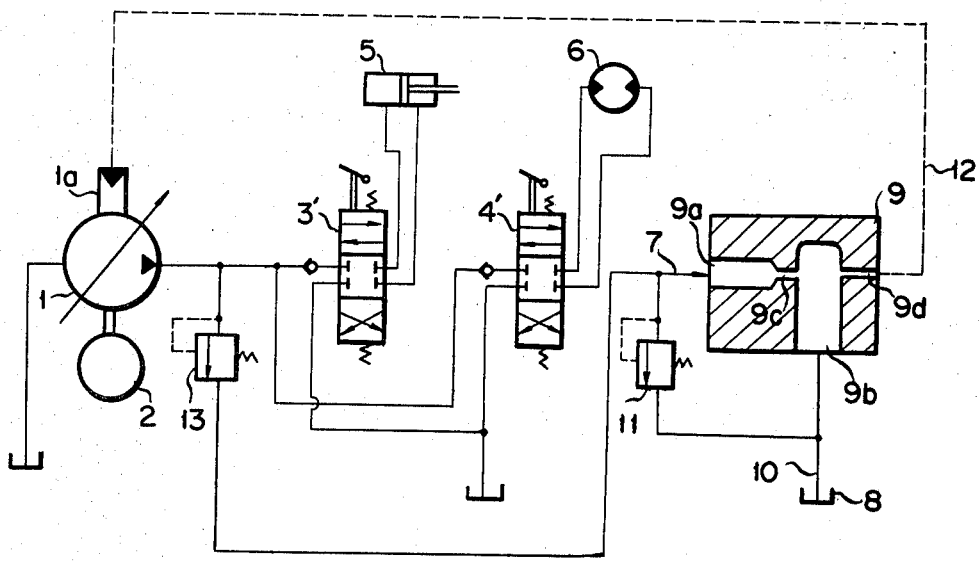
FIG. 2 is a hydraulic circuit showing another embodiment of the present invention.

FIG. 2 shows another embodiment of the present invention in which the similar control to that of the previous embodiment can be made by introducing the relief pressure created by a relief valve 13 located on the delivery side of the variable displacement pump 1 and on the upstream side of actuator control valves 3' and 4' into the inlet port 9a of the jet flow sensor 9. As for the control valves 3' and 4' shown in FIG. 2, generally available closed-center three-position four-port valves can be used, and there is no need of forming a bypass passage in each of the control valves.

As described in detail hereinabove, according to the first embodiment of the present invention, the arrangement is made such that the static pressure is converted into the dynamic pressure by means of the jet flow sensor provided in the bypass passage so that the amount of the fluid delivered by the variable displacement pump is controlled by the dynamic pressure. Therefore, the amount of the fluid delivered by the variable displacement pump will be reduced to its minimum when all the control valves are located at their neutral positions. Consequently, the power loss can be reduced substantially and also the sudden pressure changes generated in the bypass passage can be relieved by the action of the nozzle adapted to convert the static pressure into a dynamic pressure. Therefore sensitivity of the relief valve for relieving excessive pressure can be reduced considerably as compared to that of the conventional system. Therefore, commercially available relief valves can be employed in the circuit of the present invention, and so it is possible to provide the circuit itself at a lower cost.

It is to be understood that the foregoing description is merely illustrative of the preferred embodiments of the present invention, and that the scope of the invention is not to be limited thereto, but is to be determined by the scope of the appended claims.

What we claim is:

1. A hydraulic circuit for controlling displacement of a variable displacement pump including a servo mechanism connected thereto for controlling the same, comprising:

an actuator driven by said variable displacement pump;

a control valve disposed between said variable displacement pump and said actuator for controlling the latter; and means for converting static pressure of a fluid into a dynamic pressure thereof, said means being disposed in a circuit for connecting a system pressure line of the hydraulic circuit to a reservoir when said control valve occupies its neutral position and comprising a body having formed therein an inlet port connected to the system pressure line and an outlet port connected to the reservoir, said body also having formed therein a nozzle provided between said inlet and outlet ports for producing a jet flow of the fluid and a dynamic pressure sensing means operatively connected to the servo mechanism for said variable displacement pump.

2. A hydraulic circuit for controlling displacement of a variable displacement pump as recited in claim 1 wherein said control valve has formed therein a bypass passage in the neutral position thereof and said circuit for connecting the system pressure line to the reservoir is a bypass circuit connected to said bypass passage.

3. A hydraulic circuit for controlling displacement of a variable displacement pump as recited in claim 1 wherein said circuit for connecting the system pressure line to the reservoir includes a relief valve circuit for relieving a system pressure fluid to the reservoir.

4. A hydraulic circuit for controlling displacement of a variable displacement pump as recited in claim 1, 2 or 3 further comprising a relief valve for connecting the inlet port of said static to dynamic pressure converting means to the reservoir.

* * * * *